F. WINKLER.
PLANET GEARING FOR VARIABLE SPEEDS.
APPLICATION FILED MAY 28, 1912.
1,045,237.
Patented Nov. 26, 1912.
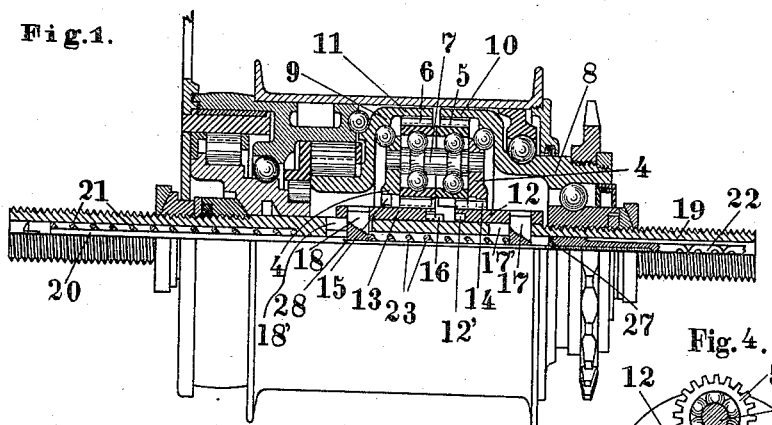
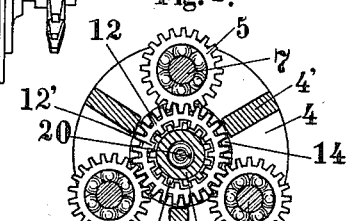
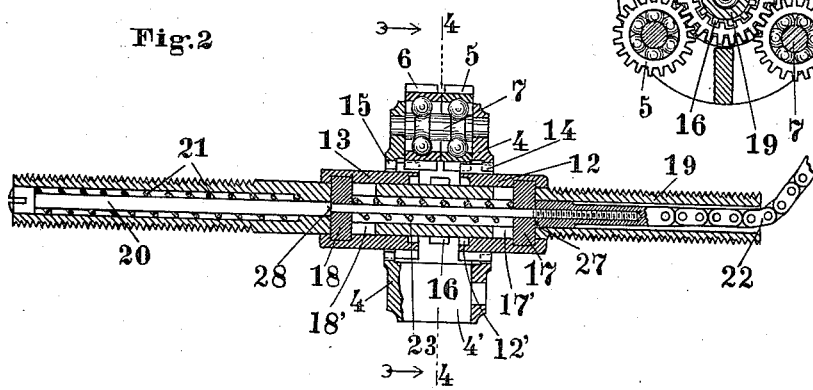
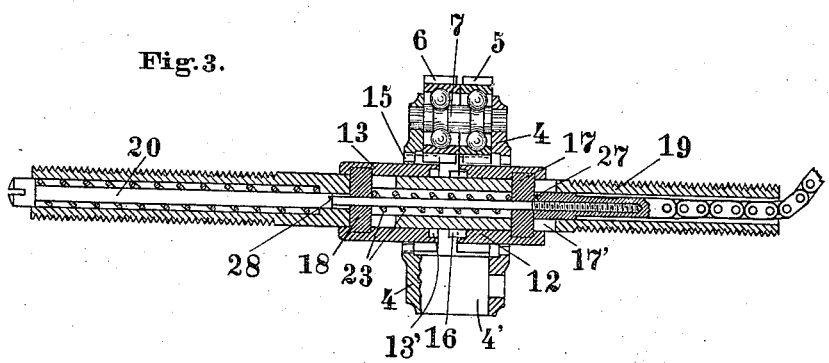
Witnesses
W. Wallace Nairn Jr.
Rosina J. Finotti
Inventor
Franz Winkler
By Julius C. Dowell
his attorney.

UNITED STATES PATENT OFFICE.

FRANZ WINKLER, OF SCHWEINFURT, GERMANY, ASSIGNOR TO SCHWEINFURTER PRÄCISIONS-KUGEL-LAGER-WERKE FICHTEL & SACHS, OF SCHWEINFURT, GERMANY, A FIRM.

PLANET-GEARING FOR VARIABLE SPEEDS.

1,045,237.   Specification of Letters Patent.   Patented Nov. 26, 1912.

Application filed May 28, 1912.   Serial No. 700,225.

*To all whom it may concern:*

Be it known that I, FRANZ WINKLER, a subject of the King of Bavaria, residing at No. 23 Rossbrunnstrasse, Schweinfurt, in Germany, have invented a new and useful Planet-Gearing for Variable Speeds, of which the following is a specification.

The invention relates to a change-speed gearing for several speeds, comprising two complete planet-wheel gearings arranged side-by-side and with their planet wheels supported in a freely rotatable carrier, the sun-wheels of the gearings being axially displaceable and adapted to be coupled in different ways, so as to be fixed stationary or rotatable with other members of the gearing.

In order to produce a structure of small length in which the stroke of the shifting parts is reduced to a minimum, the stationary clutch device is disposed between the sun-wheels which are connected with the controlling device in a manner to be movable with respect to each other, the resilient means used for this purpose bearing against special guide-members of the sun-wheels, axial pressure thus being prevented from acting directly on the sun-wheels. Owing to the guide members being controlled and checked by stops of the stationary axle and of the shifting device, the two sun-wheels can be adjusted independently of one another.

In the drawing forming a part of this specification a construction embodying the invention is represented by way of example.

Figure 1 represents in its upper part a longitudinal section of a planet-wheel gearing in accordance with the invention in combination with a coaster-hub for cycles, and in its lower part a side elevation of the hub-barrel. Figs. 2 and 3 illustrate in a similar longitudinal section some principal parts of the gearing, showing the sun-wheels in different positions in which the transmission with various speeds is obtained. Fig. 4 shows a cross-section taken on the line 4—4 of Fig. 2.

Like numerals designate like parts throughout all figures of the drawing.

The change-speed planet-gearing consists of two sets of planet-wheels 5 and 6 which run in pairs on pivot pins 7 in a planet-wheel carrier, composed of end plates 4 and cross plates 4' rigidly connecting the end plates. The one set of planet-wheels 5 gears with an inside crown-wheel 10 on the driving member 8 and with a sun-wheel 12 free to rotate and slidable on the axle 19, while the other set of planet-wheels meshes similarly with a crown-wheel 11 on the driven member 9 and with a sun-wheel 13 arranged in the like manner. The planet-wheel carrier has formed within the bores of its side walls 4 the internal teeth 14 and 15 in which can be engaged the corresponding teeth of the sun-wheels 12 and 13, respectively, while fast on the axle 19 a toothed clutch device 16 is provided corresponding to clutch teeth 12' and 13' on the adjacent sides of the two sun-wheels 12 and 13, respectively. The various changes in the gear ratio are effected by sliding the sun-wheels on the hollow axle 19 by means of a controlling device located within the latter. This device consists of the keys 17 and 18 passing through slots 17' and 18' in the axle and engaging with their ends in circumferential grooves in the bores of the sun-wheels, these keys being axially loose on a controlling rod 20 which is slidable inside the axle and has stops or shoulders 27 and 28 which embrace or check the keys from opposite sides, so that the keys can move relatively to one another between the shoulders. A spring 23, the ends of which abut against the two keys 17 and 18, tends to press said keys apart and to move them outwardly when one of the shoulders 27 and 28, respectively, of the rod 20 is moved in the same direction, until the movement of the keys is limited by the end of the slots 17' and 18', respectively. The controlling rod 20 itself is operated by a spiral spring 21 tending to force it toward the left; its movement to the right being brought about by means of a chain 22 attached thereto which is pulled at any distance by hand or any mechanism.

The change-speed gearing is shown applied to a bicycle hub, but it can of course be used for various other purposes, for example, as differential gearing on motor-cars as an intermediate gearing in any transmission device, or as an auxiliary to the ordinary change wheels in machine tools, such as screw-cutting lathes.

The gearing operates as follows: When the controlling device is fixed in an intermediate position in which the shoulders 27 and 28 of the rod 20 do not work inwardly against the keys 17 and 18, but the latter are forced outward or apart by the spring 23 against the outer ends of the slots 17' and 18' guiding them (Fig. 2), the sun-wheels 12 and 13, engage with the teeth 14 and 15 respectively on the planet-wheel carrier, remaining however in gear with the corresponding planet-wheels 5 and 6, respectively. The result of this locked connection is that the two sets of planet-wheels 5, 6 cannot turn on their pivots 7. Consequently none of the various wheels roll on one another, but the driving member 8 by means of its crown-wheel 10 rotates the carrier with itself at the same speed, and the latter drives the driven member 9, the two sun-wheels rotating freely on the axle because the keys 17 and 18 are free to move circumferentially in the grooves in these sun-wheels. When the controlling device is moved to the right by pulling the chain 22, the right-hand planet-wheel system remains in the same position as just described, but the shoulder 28 on the rod 20 pushes the key 18, against the pressure of the spring 23 which is thereby compressed, to the right, and consequently the sun-wheel 13 is forced along the axle till its clutch teeth 13' engage with the stationary clutch teeth 16, while it is disengaged from the teeth 15 of the planet-wheel carrier 4. The left-hand planet-wheel system is thus brought into its operating condition (Fig. 1) in which the planet-wheels 6 can rotate on their pivots 7. On the gearing being driven, the planet-wheels 5 remain locked; the carrier is therefore driven at the same speed as the driving member 8, while the planet-wheels 6, driven by, and rotating on the pivots 7, roll on their stationarily fixed sun-wheel 13 and simultaneously on the crown-wheel 11, whereby the driven member obtains a greater speed than the driving one. When the chain 22 is released, the spring 21 forces the rod 20 so far to the left that the key 17 carried along with the shoulder 27 moves the sun-wheel 12 in the same direction, which sun-wheel therefore becomes engaged with the stationary clutch teeth 16 (Fig. 3). The right-hand planet-wheel system 5 is thus brought into its operating position, but the sun-wheel 13, simultaneously forced to the left by the spring 23, couples the planet-wheels 6 with the carrier 4 because it engages with the teeth 15 thereof. When driving the gearing, the planet-wheels 5 now roll on their sun-wheel 12 and on the crown-wheel 10, and speeding down is obtained in the system. The planet-wheel carrier and the driven member 9 cannot move relatively to one another, and consequently this reduced speed is transmitted to the driven member by the carrier.

This special gearing is advantageous in various ways, principally owing to its simplicity and compact construction, the change in the various gear ratios being effected merely by shifting the two sun-wheels. In the inoperative position the planet-wheels are directly coupled with their carrier, so that jamming is avoided in the mechanism. All the toothed wheels then remain in gear and consequently breakage of the teeth at their ends will not so readily occur when changing the speed. In certain respects the controlling device is automatic, because the sun-wheels are brought into their places in one direction by spring pressure. One single clutch member serves for both the sun-wheels. At the normal speed the toothed wheels are locked, and the change to the higher and lower gear-ratios is brought about by moving the sun-wheels out of their middle position toward the right or left so that the changes take place almost without shocks.

What I claim as my invention, and desire to secure by Letters Patent, is:

1. In a planet-gearing for variable speeds, the combination with two complete sets of planet-wheels, of a planet-wheel carrier common to both sets, displaceable sun-wheels adapted to be coupled with the said carrier, and a stationary clutch member for the sun-wheels located between them.

2. In a planet-gearing for variable speeds, the combination with a number of sets of planet wheels, of a planet wheel carrier composed of end plates and connecting parts, pivot pins common to all sets of planet-wheels, which pivots are supported in the said end plates of the carrier, said plates having clutch teeth formed at their inner edges, and axially movable sun-wheels adapted to be engaged with the said clutch teeth while remaining in gear with the planet wheels.

3. In a planet-gearing for variable speeds, the combination with two sets of planet-wheels, of axially movable sun-wheels, a common planet-wheel carrier having clutch teeth adapted to be engaged by the sun-wheels, a common stationary clutch member adapted to be alternately engaged by the sun-wheels, and means capable of shifting the sun-wheels independently of one another.

4. In a planet-gearing for variable speeds, the combination with a number of planet-wheels, of a common planet-wheel carrier, having clutch teeth formed thereon, sun-wheels movable independently of one another and adapted to be engaged with said clutch teeth of the carrier, a common stationary clutch member located between the sun-wheels and adapted to be alternately engaged by them, a shifting device for moving the sun-wheels, and resilient means interposed between the sun-wheels and the shifting device.

5. In a planet-gearing for variable speeds, the combination with a number of planet-wheels, of axially displaceable sun-wheels, separate guide-members in positive engagement with the sun-wheels, a controlling device on which the said guide-members are loosely mounted, resilient means interposed between the guide-members, shoulders on the controlling device capable of checking the guide-members against the pressure of the said resilient means and carrying said members with them in opposite directions, and stationary stops for limiting the movement of the said guide-members.

6. In a planet-gearing for variable speeds, the combination with two sets of planet-wheels, of a common planet-wheel carrier, having a plurality of clutch members provided thereon, axially displaceable sun-wheels adapted to engage the clutch members of the carrier, a common stationary clutch member located between the sun-wheels, separate guide-members for the sun-wheels, a spring interposed between the said guide-members, and a controlling device having stops adapted to carry along the single guide-members in opposite directions, thus engaging the sun-wheels alternately with the said stationary clutch member.

7. In a planet-gearing for variable speeds, the combination with a number of planet-wheels, of a stationary axle supporting the entire mechanism, sun-wheels axially displaceable upon the said axle, a controlling device movable within the axle, separate guide-members for the sun-wheels, which members are loose on the controlling device, said axle being provided with slots through which said guide-members project, the ends of the slots constituting stationary stops for the guide-members, shoulders on the controlling device capable of carrying the single guide-members in opposite directions, and resilient means interposed between the guide-members, so as to force them apart toward the said shoulders or stationary stops, respectively.

8. In a planet-gearing for variable speeds, the combination with two sets of planet-wheels, of an axle supporting the entire mechanism, driving and driven members, provided with internal toothed rims meshing each with one set of planet-wheels, a planet-wheel carrier supported on the driving and driven members and having pivot pins common to both sets of planet-wheels, a plurality of clutch members provided on the planet-wheel carrier, sun-wheels rotatable and axially displaceable on the axle and adapted to engage the said clutch members of the carrier, a stationary clutch member arranged on the axle between the sun-wheels, said stationary clutch member being common to both sun-wheels, a controlling device movable within the axle, separate guide-members in positive engagement with the sun-wheels and loose on the controlling device, the axle having slots through which the guide-members project, shoulders on the controlling device adapted to carry the guide-members along, and a spring interposed between the guide-members tending to force them apart toward the said shoulders.

In testimony whereof I have signed my name to this specification in the presence of two subscribing witnesses.

FRANZ WINKLER.

Witnesses:
JEAN GRUND,
CARL GRUND.

---

Copies of this patent may be obtained for five cents each, by addressing the "Commissioner of Patents, Washington, D. C."